3,221,029
AUTOGENOUS, VITAMIN E ACTIVE BEADLET PRODUCT AND PROCESS
Charles H. Benton, Jr., Rochester, N.Y., assignor to Eastman Kodak Company, Rochester, N.Y., a corporation of New Jersey
No Drawing. Filed Mar. 7, 1961, Ser. No. 93,846
7 Claims. (Cl. 260—345.5)

This invention relates to the chemical arts. More particularly, it relates to vitamins.

A problem of long standing in the vitamins art has been to develop a commercial, dry, free flowing, high density, solid (in the sense of not liquid), high potency, vitamin E active beadlet product. Such a product has utility in dry-fill capsules and tablets and in dry-blended animal feeds. The basic reason for the existence of such a problem is that many vitamin E compounds, especially α-tocopherol and α-tocopheryl acetate, have oily or oleaginous properties.

Attempts heretofore made to solve this problem have generally involved the concept of a normally solid carrier for the oily, vitamin E compound. Examples of such a carrier are gelatin, gum acacia, pectin, waxes and the like. The general procedure in these instances is to liquify the carrier as by application of heat or by dissolution in water, disperse the oily, vitamin E compound in the liquid carrier, and then convert the liquid carrier with its dispersed vitamin E compound into finely divided, solid, particulate material. These attempts have led to commercially available products. However, these products have one or more serious shortcomings. Thus, the dry vitamin E products currently available commercially for use in dry-fill capsules and tablets are not satisfactory for the preparation of high potency tablets or pills because the particles have low vitamin E potency or because the particles have such low density and are so tacky that they cannot be effectively utilized in commercial tableting and filling equipment. Hence, the prior art has not adequately solved the problem.

A general object of this invention is to solve this problem. In particular an object of this invention is to provide a dry, free flowing, high density, solid, high potency, vitamin E active, beadlet product.

A specific object of this invention is to provide a vitamin E active beadlet product which overcomes the shortcomings of the vitamin E particles of the prior art.

These and other objects which may appear as this specification proceeds are achieved by this invention.

In summary, this invention comprises a dry, free flowing, high density, solid, high potency, vitamin E active, beadlet product consisting essentially of a pure, non-oily, normally solid, beadlet forming, vitamin E active compound. This invention also comprises a process for preparing this product.

In brief, this invention is based on the discovery that d-α-tocopheryl acid succinate, a normally solid material at room temperature, can be melted at elevated temperatures, formed while in the molten state into tiny globules or droplets and then cooled to give dry, free flowing, solid, high density, high potency, vitamin E active beadlets. Thus, the product of this invention may be aptly described as an autogenous, vitamin E active, beadlet product.

d-α-Tocopheryl acid succinate is a well-known, high potency, vitamin E active compound. See The National Formulary, eleventh edition, page 380. d-α-Tocopheryl acid succinate, National Formulary grade (N.F.), is a white crystalline powder insoluble in water and melts between 73° C. and 78° C. d-α-Tocopheryl acid succinate can be obtained by reacting α-tocopherol with succinic anhydride on a mole for mole basis in an inert solvent, removing unreacted succinic anhydride and solvent from the reaction product and then, if desired, the reaction product extracted or otherwise purified, for example, as by the procedure of U.S. Patent, No. 2,358,046, to Baxter and Lehman. Racemic α-tocopheryl acid succinate or dl-α-tocopheryl acid succinate (which can be prepared by this same procedure from dl-α-tocopherol) does not appear to form beadlets under the process conditions of this invention. Hence, as between the racemic and optically active forms only d-α-tocopheryl acid succinate is employed under the concepts of this invention.

A preferred embodiment of the process of this invention comprises the steps of (1) dispersing molten d-α-tocopheryl acid succinate in an inert liquid dispersion medium in which the d-α-tocopheryl acid succinate is insoluble and which has a viscosity selected in accordance with the desired particle sizes of the beadlets to be formed, (2) removing heat from the dispersion medium whereby the dispersed droplets of d-α-tocopheryl acid succinate crystallize to form beadlets, and (3) separating beadlets from the dispersion medium. Preferably the inert liquid dispersion medium is an aqueous solution of water and a thickening agent. The thickening agent assists in maintaining the molten d-α-tocopheryl acid succinate in dispersed condition while heat is removed therefrom and also enables the viscosity of the aqueous solution to be controlled in accordance with the desired average particle size of the droplets and thus of the resulting beadlets.

To enable basic concepts, features and advantages of this invention to be demonstrated the following examples are presented. In this regard, the examples are set forth for purposes of illustration and not of restriction.

*Example 1*

This example is an illustration of the aforementioned preferred embodiment of the process of this invention and of a typical autogenous, vitamin E active, beadlet product of this invention.

50 frams of d-α-tocopheryl acid succinate (N.F.) were melted and the molten mass heated to a temperature of 85° C. At the same time, 500 milliliters of a dispersion medium, an aqueous solution of methyl cellulose, was prepared by admixing water and methyl cellulose (commercially available from the Dow Chemical Company as Methocel, Type 15 cps., which methyl cellulose is produced so as to give when present in water solution at a concentration of 2% by weight a Brookfield viscometer viscosity of 15 centipoises at 20° C.) and heating to 70° C. The aqueous solution had a methyl cellulose concentration of 1 weight percent and a Brookfield viscometer viscosity of 10 centipoises at 23° C. The molten d-α-tocopheryl acid succinate was then added to the methyl cellulose solution and dispersed therein by agitating the mixture with a 2″ turbine type stirrer revolving at 400 r.p.m.

As soon as tiny globules or droplets of molten d-α-tocopheryl acid succinate had formed in the methyl cellulose solution, the temperature of the dispersion medium was rapidly lowered to 10° C. and held at that temperature until the droplets had solidified into beadlets and hardened. Thereupon the beadlets were filtered from the methyl cellulose solution and air dried.

The product was observed to be non-sticky and free flowing. It had a high bulk density of 24 to 38 pounds per cubic foot compared to 9 pounds per cubic foot for pulverized d-α-tocopheryl acid succinate crystals. Particle size distribution of the beadlets was 60% by weight plus 60 mesh U.S. screen size and 40% by weight minus 60 mesh U.S. screen size.

Example 2

This example in comparison with the data of Example 1 illustrates in a general way the influence of viscosity of the dispersion medium on particle size of the beadlets.

500 milliliters of a 1% by weight solution of locust bean gum were prepared as a dispersion medium. The solution had a viscosity, as determined by a Brookfield viscometer, of 83 centipoises at 25° C. The temperature of the aqueous solution was adjusted to 70° C.

67 grams of powdered d-α-tocopheryl acid succinate (N.F.) were melted and poured in a thin stream into the locust bean gum dispersion medium while the medium was agitated with a 2″ turbine type stirrer turning at 500 r.p.m. The molten d-α-tocopheryl acid succinate dispersed into droplets. The temperature of the mixture was allowed to drop to 23° C. which resulted in the dispersed droplets solidifying and hardening to form beadlets. The beadlets were filtered from the aqueous solution, washed with water and then dried under vacuum in a rotating container.

The product was observed to be in the form of fine, white, free flowing, beadlets with a bulk density of 24.3 pounds per cubic foot. The particle size distribution was found to be 3.8 weight percent plus 40 mesh, 27.9 weight percent minus 40 mesh plus 60 mesh and 68.2 weight percent minus 60 mesh, the mesh in each case being U.S. screen size.

Thus, an increase in viscosity of the dispersion medium tends to result in finer particle sizes of the beadlet product. Of course, the speed and type of agitation may also be varied so as to obtain coarser or finer average beadlet sizes.

Example 3

This example is an illustration of the production of the autogenous, vitamin E active, beadlet product under another set of process conditions.

67 grams of d-α-tocopheryl acid succinate were melted and heated to 80° C. and in the molten state poured into 500 milliliters of a dispersion medium consisting of an aqueous solution having a 2% by weight concentration of acid pigskin gelatin (gel strength: "75 grams bloom") which solution had previously been heated to a temperature of 70° C. The mixture was stirred with a 2″ turbine type stirrer at 500 r.p.m. until the molten d-α-tocopheryl acid succinate was dispersed into fine droplets. The mixture was then rapidly chilled and allowed to stand at 7° until the beadlets had solidified and hardened. The gelatin solution was then warmed to 35° C. and digested with pepsin (0.25% by weight) for 30 minutes. The digested gel solution was diluted with water and the mixture of solution and beadlets filtered. The filter cake of beadlets was washed with well water and dried under vacuum. The resulting product was observed to be in the form of free flowing beadlets having a bulk density of 34.5 pounds per cubic foot. Screen analysis showed that 70% by weight of the beadlets were minus 20 mesh plus 100 mesh U.S. screen size.

Example 4

This example demonstrates that dl-α-tocopheryl acid succinate does not form beadlets under the general process conditions of this invention.

10.0 grams of dl-α-tocopheryl acid succinate were melted at 80° C. and added to 100 milliliters of an aqueous solution of "Methocel, Type 15 cps." methyl cellulose. The methyl cellulose concentration was 1 weight percent and the temperature of the solutions was 70° C. During the addition and thereafter the solution was stirred or agitated by a 2″ turbine stirrer at approximately 400 r.p.m. After addition and with continued stirring the temperature was maintained at 70° C. for 1 minute, lowered rapidly to 10° C. and then held at 10° C. for 1 hour. At the end of this period, the dl-α-tocopheryl acid succinate remained a tacky and semi-solid mass which had not dispersed into discrete particles or beadlets.

Example 5

This example further demonstrates that dl-α-tocopheryl acid succinate does not form beadlets under the general process conditions of this invention.

A repeat performance of the run of Example 4, except that the methyl cellulose solution was rapidly cooled to an even lower temperature (0° C.), resulted in an agglomerated semi-solid mass displaying no tendency to form beadlets.

Example 6

This example illustrates the utility of the autogenous, vitamin E active, beadlet product of this invention is dry-fill tablets and the like.

The beadlet product described in Example 1 was worked up on a tableting machine using a standard tableting formulation. Six to seven grain tablets were thereby readily prepared. These tablets had 100 I.U. of vitamin E activity. In contrast similar tablets could not be prepared from d-α-tocopheryl acid succinate crystals. In further contrast, currently commercially available d-α-tocopheryl acetate-gelatin beadlets resulted in 6–7 grain tablets having a maximum potency of only about 25 I.U.

The beaded or beadlet productg of this invention not only has the advantages of high bulk density and flowability but also decreased capping due to the low surface area of the particles. "Capping" is an undesirable condition occurring during tableting operations as a result of sticking of the tablet granulation to the dies of the tableting machine.

Other embodiments, features and advantages of this invention will be apparent to those in the exercise of ordinary skill in the art upon reading the foregoing disclosure. In this regard, all embodiments including variations and modifications thereof embracing the spirit and essential characteristics of this invention are within the scope of the claimed subject matter unless expressly excluded by claim language.

I claim:

1. An autogenous, free flowing, solid, high potency, vitamin E active product consisting essentially of beadlets of d-α-tocopheryl acid succinate having a bulk density in a range from about 24 to about 38 pounds per cubic foot and a particle size in a range from about 20 to about 100 mesh U.S. screen size.

2. A process for preparing a substantially dry, finely divided, free flowing, dense, highly potent, vitamin E active beadlet product, which comprises: melting a quantity of d-α-tocopheryl acid succinate whereby a molten mass of d-α-tocopheryl acid succinate is formed; establishing and maintaining said molten mass as dispersed droplets by admixing said molten mass with an inert liquid dispersion medium in which said d-α-tocopheryl acid succinate is insoluble and which has a viscosity selected in accordance with the desired average beadlet size and thus the desired average droplet size; solidifying and hardening said droplets by removing heat from said liquid dispersion medium and thus said droplets until the temperature of said medium and thus said droplets is below the solidifying temperature of said d-α-tocopheryl acid succinate, whereby beadlets are formed; and separating said beadlets from said liquid dispersion medium.

3. A process for preparing a substantially dry, finely divided, free flowing, dense, highly potent, vitamin E active beadlet product, which comprises: melting a quantity of d-α-tocopheryl acid succinate whereby a molten mass of d-α-tocopheryl acid sucinate is formed; establishing and maintaining said molten mass as dispersed droplets by admixing said molten mass with a liquid dispersion medium consisting of an aqueous solution at a temperature in a range up to about that of said mass, said solution consisting essentially of water and a thickening agent, the concentration of said thickening agent being selected so that the solution has a Brookfield viscometer viscosity at 25° C. in the range from about 10 centipoises to about 100 centipoises; solidifying and hardening said droplets by rapidly removing heat from said liquid dispersion medium and thus said droplets until the temperature of said medium and thus said droplets is below about 10° C., whereby beadlets are formed; separating said beadlets from said liquid dispersion medium; and surface drying said beadlets.

4. A process according to claim 3 wherein said thickening agent is methyl cellulose.

5. A process according to claim 3 wherein said thickening agent is locust bean gum.

6. A process according to claim 3 wherein said thickening agent is gelatin.

7. A process according to claim 3 wherein said thickening agent is gelatin and said separating of said beadlets from said liquid dispersion medium is accomplished by first digesting said thickening agent with pepsin, diluting said liquid dispersion medium and then filtering said beadlets therefrom.

References Cited by the Examiner

UNITED STATES PATENTS

| | | | |
|---|---|---|---|
| 2,183,053 | 12/1939 | Taylor | 99—11 |
| 2,183,084 | 12/1939 | Reynolds | 99—11 |
| 2,218,592 | 10/1940 | Taylor | 99—11 |
| 2,349,273 | 5/1944 | Baxter et al. | 260—345.6 |
| 2,358,046 | 9/1944 | Baxter et al. | 260—345.5 |
| 2,562,840 | 7/1951 | Caldwell | 99—11 |
| 2,643,209 | 6/1953 | Goett et al. | 99—11 |
| 2,940,900 | 6/1960 | Benton | 167—81 |
| 2,987,444 | 6/1961 | Allardice | 167—81 |

FOREIGN PATENTS 824,912 12/1959 Great Britain.
866,489 4/1961 Great Britain.

OTHER REFERENCES

Baxter et al.: Journal American Chemical Society, vol. 65, pp. 918–924 (1943).

Joffe et al.: Journal American Chemical Society, vol. 65, pp. 925–927 (1943).

WALTER A. MODANCE, *Primary Examiner.*

IRVING MARCUS, *Examiner.*